United States Patent
Fu et al.

(10) Patent No.: US 9,485,099 B2
(45) Date of Patent: Nov. 1, 2016

(54) APPARATUS, SYSTEMS AND METHODS FOR AGILE ENABLEMENT OF SECURE COMMUNICATIONS FOR CLOUD BASED APPLICATIONS

(71) Applicant: CLIQR TECHNOLOGIES INC., Sunnyvale, CA (US)

(72) Inventors: Tianying Fu, San Jose, CA (US); Jagadish Paranjape, San Jose, CA (US)

(73) Assignee: CLIQR TECHNOLOGIES, INC., San Jose, CA (US)

( * ) Notice: Subject to any disclaimer, the term of this patent is extended or adjusted under 35 U.S.C. 154(b) by 135 days.

(21) Appl. No.: 14/063,950

(22) Filed: Oct. 25, 2013

(65) Prior Publication Data

US 2015/0121078 A1 Apr. 30, 2015

(51) Int. Cl.
H04L 29/06 (2006.01)
H04L 9/32 (2006.01)
G06F 21/30 (2013.01)
H04L 9/00 (2006.01)

(52) U.S. Cl.
CPC .............. H04L 9/3263 (2013.01); G06F 21/30 (2013.01); H04L 9/006 (2013.01)

(58) Field of Classification Search
CPC .. H04L 9/3263; H04L 2209/64; G06F 21/30
USPC ........................................................ 713/175
See application file for complete search history.

(56) References Cited

U.S. PATENT DOCUMENTS

| | | | |
|---|---|---|---|
| 6,718,535 B1 | 4/2004 | Underwood | |
| 7,028,218 B2 | 4/2006 | Schwarm et al. | |
| 7,523,190 B1 | 4/2009 | Bickerstaff et al. | |
| 7,809,975 B2 | 10/2010 | French et al. | |
| 7,849,350 B2 | 12/2010 | French et al. | |
| 7,853,767 B2 | 12/2010 | Maki et al. | |
| 8,090,979 B2 | 1/2012 | Watanabe et al. | |
| 8,176,208 B2 | 5/2012 | Shishido et al. | |
| 8,195,934 B1 * | 6/2012 | Lawrence | H04L 63/0823 713/156 |
| 8,250,215 B2 | 8/2012 | Stienhans et al. | |
| 8,386,839 B2 | 2/2013 | Watanabe et al. | |
| 8,489,918 B2 | 7/2013 | Watanabe et al. | |
| 8,904,005 B2 | 12/2014 | Ferris et al. | |
| 2002/0013895 A1 | 1/2002 | Kelley et al. | |
| 2002/0120741 A1 | 8/2002 | Webb et al. | |
| 2004/0093419 A1 * | 5/2004 | Weihl | H04L 63/06 709/229 |
| 2004/0098458 A1 | 5/2004 | Husain et al. | |
| 2007/0083650 A1 | 4/2007 | Collomb et al. | |

(Continued)

OTHER PUBLICATIONS

"Third-Party Submission under 37 CFR 1.290 Concise Description of Relevance," filed in U.S. Appl. No. 14/497,196 on Feb. 18, 2015.

*Primary Examiner* — John B King
(74) *Attorney, Agent, or Firm* — Venkatesh Krishnamoorthy; Silicon Valley Patent Group, LLP

(57) ABSTRACT

Embodiments disclosed facilitate secure communication for cloud-based and/or distributed computing applications. In some embodiments, a method may comprise: instantiating a first Virtual Machine (VM) on a cloud infrastructure, wherein the at least one first VM is dynamically configured with a private key and a wildcard security certificate comprising a public key corresponding to the private key, and registering, with a domain name server, a domain name derived from an Internet Protocol (IP) address associated with the first VM and a Common Name associated with the wildcard security certificate.

23 Claims, 6 Drawing Sheets

(56) References Cited

U.S. PATENT DOCUMENTS

| | | |
|---|---|---|
| 2007/0260702 A1 | 11/2007 | Richardson et al. |
| 2009/0083537 A1* | 3/2009 | Larsen ............... H04L 63/0281 |
| | | 713/153 |
| 2009/0092247 A1* | 4/2009 | Kido .................... H04L 63/062 |
| | | 380/30 |
| 2009/0216975 A1 | 8/2009 | Halperin et al. |
| 2009/0300151 A1 | 12/2009 | Friedman et al. |
| 2009/0307486 A1* | 12/2009 | Grajek ............... H04L 63/0272 |
| | | 713/156 |
| 2009/0319793 A1* | 12/2009 | Zic ......................... G06F 21/34 |
| | | 713/172 |
| 2010/0042720 A1 | 2/2010 | Stienhans et al. |
| 2010/0061250 A1 | 3/2010 | Nugent |
| 2010/0070319 A1 | 3/2010 | Prafullchandra et al. |
| 2010/0088150 A1 | 4/2010 | Mazhar et al. |
| 2010/0125476 A1 | 5/2010 | Yeom et al. |
| 2010/0125844 A1 | 5/2010 | Mousseau et al. |
| 2010/0191796 A1 | 7/2010 | Almeida et al. |
| 2010/0228819 A1 | 9/2010 | Wei |
| 2010/0235830 A1 | 9/2010 | Shukla et al. |
| 2011/0185292 A1 | 7/2011 | Chawla et al. |
| 2011/0320821 A1 | 12/2011 | Alkhatib et al. |
| 2012/0096271 A1* | 4/2012 | Ramarathinam ... H04L 63/0807 |
| | | 713/172 |
| 2012/0131591 A1 | 5/2012 | Moorthi et al. |
| 2012/0158803 A1 | 6/2012 | Kandasamy et al. |
| 2012/0159459 A1 | 6/2012 | Turner et al. |
| 2012/0179820 A1 | 7/2012 | Ringdahl et al. |
| 2012/0203823 A1 | 8/2012 | Manglik et al. |
| 2012/0239739 A1 | 9/2012 | Manglik et al. |
| 2012/0254966 A1 | 10/2012 | Parker |
| 2012/0331528 A1 | 12/2012 | Fu et al. |
| 2013/0151598 A1 | 6/2013 | Fu et al. |
| 2013/0205028 A1* | 8/2013 | Crockett ............... G06F 9/5027 |
| | | 709/226 |
| 2013/0212386 A1* | 8/2013 | Rastogi ................. H04L 9/3263 |
| | | 713/168 |
| 2014/0040656 A1 | 2/2014 | Ho et al. |
| 2015/0039770 A1 | 2/2015 | Manglik et al. |
| 2015/0121078 A1 | 4/2015 | Fu et al. |
| 2015/0222604 A1* | 8/2015 | Ylonen ................. H04L 63/062 |
| | | 713/171 |

* cited by examiner

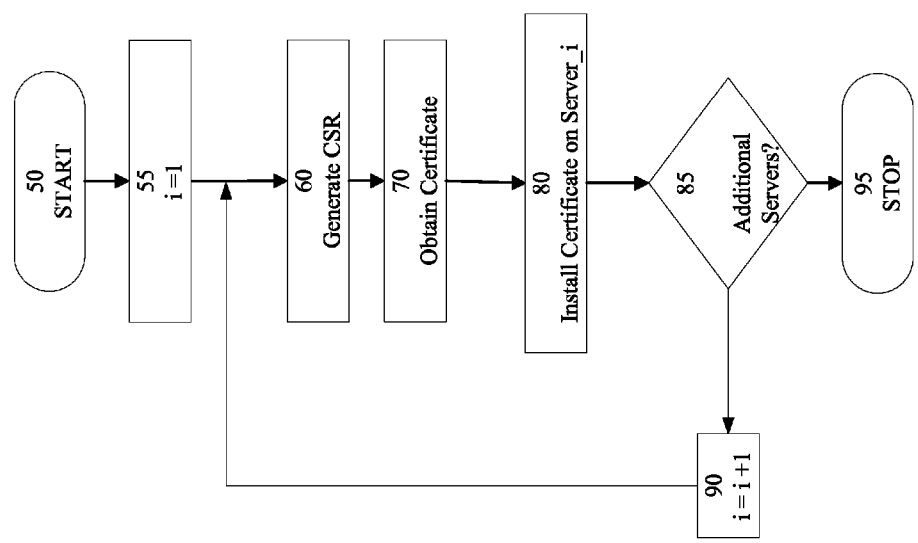

APPARATUS, SYSTEMS AND METHODS FOR AGILE ENABLEMENT OF SECURE COMMUNICATIONS FOR CLOUD BASED APPLICATIONS

BACKGROUND

1. Field of the Invention

The present invention relates to the field of distributed computing and in particular, to apparatus, systems, and methods to facilitate secure communications for cloud-based applications.

2. Description of Related Art

The performance of computing applications may often be increased by distributing the computational workload across nodes in a networked cluster of computers. A physical networked cluster of computers is often referred to as a "cloud" or "cloud infrastructure" or simply an infrastructure. The underlying physical hardware associated with clouds, which can include servers, memory, storage, and network resources, may be viewed as virtualized units. These virtualized units represent some fraction of the underlying computing hardware or resources supported by the cloud. Therefore, from a logical perspective, clouds may be viewed as a collection of virtual machines ("VMs"). A "cloud node" or "node" may be responsible for the control and operation of one or more VMs, and there may be several nodes per cloud. Typically, a cloud may provide a variety of VM types with different computing (CPU), memory, storage, networking, and Operating System (OS) options.

Clouds, thus, may be viewed as services that provide access to infrastructure remotely, including compute, storage and network resources, so that the resources can be reserved, provisioned, accessed and released programmatically. For example, programmatic interfaces such as Application Programming Interfaces (APIs), System Development Kits (SDKs), Web Services, etc. may be used to access resources made available by clouds remotely over a wide-area network (WAN). For example, in publicly available clouds or "public clouds", these resources can be accessed programmatically over the Internet and are made available as VMs on a pay-per-use basis.

Cloud-computing infrastructures offer several benefits over fixed on-premise datacenters, server farms, desktop computers, etc (collectively referred to as "organizational infrastructure") including the capability to dynamically spawn or tear down a large number of VMs rapidly. However, when applications running on one or more of the newly spawned VMs attempt to communicate securely, for example, using the hypertext transfer protocol secure ("https") with Secure Sockets Layer (SSL) and/or Transport Layer Security (TLS) certificates, human intervention or complicated schemes are often used to enable secure communication. The use of complicated schemes/protocols and/or human intervention to correctly configure https over SSL/TLS in cloud-based environments is impractical and unwieldy and also creates delays.

Thus, there is a need for systems, methods, and apparatus that facilitate the mapping and binding of SSL/TLS certificates to domain names of dynamically spawned VMs transparently in cloud-based and/or distributed computing environments while also maintaining system integrity. Accordingly, disclosed embodiments facilitate secure communication for cloud-based and/or distributed computing applications.

SUMMARY

Consistent with embodiments disclosed herein, apparatus, systems and methods for facilitating secure communications for cloud-based applications are presented. In some embodiments, a method may comprise instantiating a first Virtual Machine (VM) associated with a cloud based application on a cloud infrastructure, wherein the first VM is dynamically configured with a private key and a wildcard security certificate comprising a public key corresponding to the private key, and registering, with a domain name server, a domain name derived from an Internet Protocol (IP) address associated with the first VM and a Common Name associated with the wildcard security certificate.

In some embodiments, the method may be implemented using a virtual appliance configured with the security certificate and wherein the virtual appliance instantiates the first VM. In some embodiments, the method may be implemented using a cloud agnostic service. In some instances, the cloud agnostic service may take the form of an infrastructure independent representation that is implemented by utilizing at least one cloud specific implementation of the infrastructure independent representation of the cloud agnostic service, and wherein the at least one cloud-specific implementation of the cloud agnostic service corresponds to the cloud infrastructure.

In some embodiments, the domain name server may take the form of a DNS authoritative name server for a domain corresponding to the Common Name. In some embodiments, the domain name server may be a second VM running on the cloud infrastructure. In some embodiments, the wildcard security certificate may be a X.509 based certificate, such as a wildcard Secure Sockets Layer (SSL) or wildcard Transport Layer Security (TLS) certificate.

In some embodiments, the method may further comprise determining an expiry date associated with the wildcard security certificate. The method may further comprise dynamically obtaining a new wildcard security certificate specifying the Common Name upon detecting that the wildcard security certificate has expired; or dynamically obtaining a new security certificate security certificate specifying the Common Name upon detecting that the period for expiry of the wildcard security certificate is within a threshold. In some embodiments, the newly obtained wildcard security certificate may be dynamically installed on the first VM.

Disclosed embodiments also pertain to an apparatus comprising at least one processing system coupled to a cloud-based infrastructure, the at least one processing system comprising a secure communication module, wherein the secure communication module is configured to: dynamically configure a first VM with a private key and a wildcard security certificate comprising a public key corresponding to the private key, and register, with a domain name server, a domain name derived from an Internet Protocol (IP) address associated with the first VM and a Common Name associated with the wildcard security certificate. In some embodiments, the secure communication module may form part of a virtual appliance configured with the security certificate and wherein the virtual appliance instantiates the first VM.

In some embodiments, the secure communication module may be further configured to dynamically determine an expiry date associated with the wildcard security certificate. Further, the secure communication module may be configured to perform at least one of: dynamically obtaining a new wildcard security certificate specifying the Common Name upon detecting that the wildcard security certificate has expired; or dynamically obtaining a new security certificate security certificate specifying the Common Name upon detecting that the period for expiry of the wildcard security certificate is within a threshold.

Disclosed embodiments also pertain to an apparatus comprising at least one processing means, the processing means coupled to cloud-based infrastructure means, wherein the at least one processing means comprises a secure communication means, wherein the secure communication means further comprises: means to dynamically configure a first VM with a private key and a wildcard security certificate comprising a public key corresponding to the private key, and means for registering, with a domain name server, a domain name derived from an Internet Protocol (IP) address associated with the first VM and a Common Name associated with the wildcard security certificate.

Disclosed embodiments also pertain to a computer-readable medium comprising instructions, which when executed by a processor, perform steps in a method comprising: instantiating a first Virtual Machine (VM) associated with a cloud based application on a cloud infrastructure, wherein the first VM is dynamically configured with a private key and a wildcard security certificate comprising a public key corresponding to the private key, and registering, with a domain name server, a domain name derived from an Internet Protocol (IP) address associated with the first VM and a Common Name associated with the wildcard security certificate.

Embodiments also relate to software, firmware, and program instructions created, stored, accessed, or modified by processors using computer-readable media or computer-readable memory. The methods described may be performed on processors, various types of computers, and computing systems—including distributed computing systems such as clouds. The methods disclosed may also be embodied on computer-readable media, including removable media and non-transitory computer readable media, such as, but not limited to optical, solid state, and/or magnetic media or variations thereof and may be read and executed by processors, computers and/or other devices.

These and other embodiments are further explained below with respect to the following figures.

BRIEF DESCRIPTION OF THE DRAWINGS

FIG. 2 shows a flowchart for an exemplary method for obtaining and deploying a certificate to support a secure communication protocol on one or more servers.

DETAILED DESCRIPTION

In accordance with embodiments disclosed herein, apparatus, systems and methods to facilitate secure communications for cloud-based applications are presented.

Figure 1:
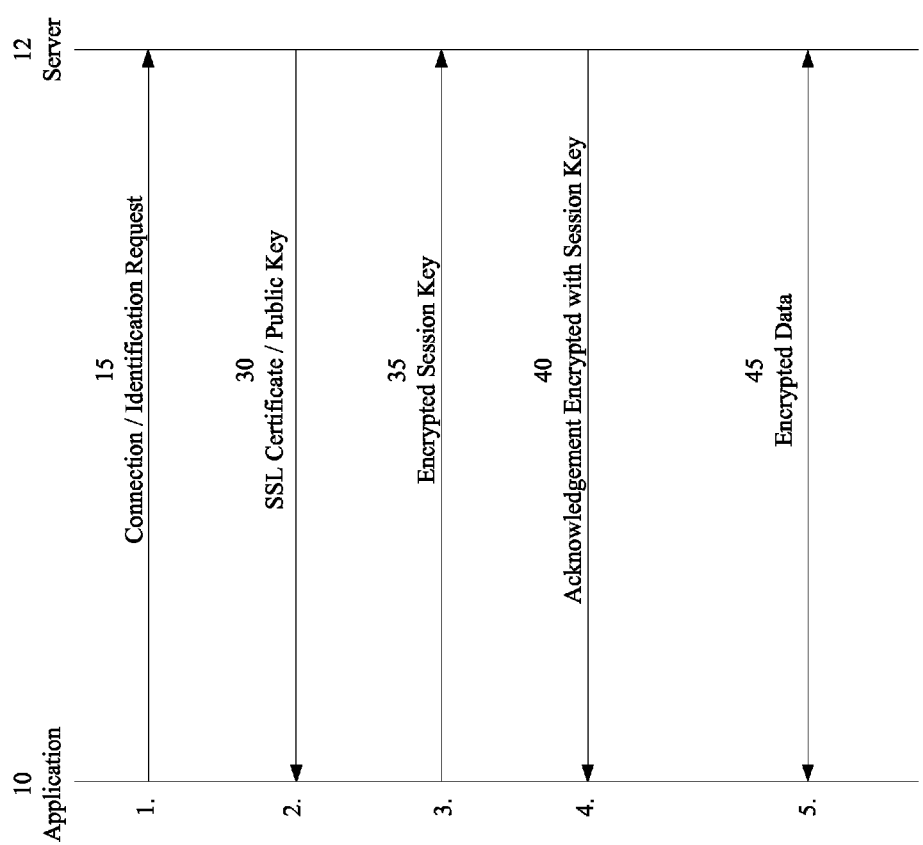
FIG. 1 illustrates an exemplary message flow for secure communication between an application and a server.

FIG. 1 illustrates an exemplary message flow 100 to facilitate secure communication between application 10 and server 12. In some instances message flow 100 may form part of an https protocol based on SSL/TLS. Typically, the SSL/TLS protocol facilitates the determination of encryption related parameters for the secure link and for the data being exchanged across the link.

In 1, Application 10 may send Connection/Identification Request 15 to server 12. For example, Application 10 may request a connection by initiating a protocol for secure connection with server 12. In some instances, the connection request may include a request for identification information from server 12.

In 2, Server 12 may respond to Connection/Identification Request 15 by sending SSL Certificate/Public Key 30. In general, any appropriate security certificate/asymmetric public key may be sent by server 12 in response to Connection/Identification Request 15. The term security certificate, which is also called a public key certificate, digital certificate, or identity certificate is used to refer to an electronic document that uses a digital signature to bind a public key with an identity. The identity may pertain to an entity and the certificate can be used to verify that the public key is associated with the entity. Typically, in public key infrastructure (PKI) schemes, the security certificate may be signed by a certificate authority (CA). The CA may be a trusted entity that issues digital certificates. Each digital certificate issued by the CA certifies ownership of a public key by a subject named on the certificate, thereby facilitating reliance (e.g. by a third party) on signatures or assertions made using a private key that corresponds to the certified public key. In PKI infrastructure models, the CA is a party trusted by the subject or owner of the certificate and by the party relying upon the certificate issued by the CA.

For example, the SSL certificate may have been obtained earlier from a trusted CA or may have been generated by an entity associated with server 12 and may include a Public Key for server 12. SSL/TLS/https certificates typically include domain names for server 12, which may be based on the Domain Name System (DNS). The certificates may, for example, be X.509 certificates. In cryptography, X.509 is an International Telecommunications Union Standardization Sector (ITU-T) standard for a PKI and Privilege Management Infrastructure (PMI). X.509 specifies standard formats for public key certificates, certificate revocation lists, attribute certificates, and a certification path validation algorithm.

DNS, which is a hierarchical distributed naming system for entities such as computers, services, and/or resources connected to the Internet or private networks, helps associate information with the domain names assigned to each of its constituent entities. For example, DNS may be used to translate domain names such as "cliqr.com" to numerical Internet Protocol (IP) addresses used to locate the entities.

DNS uses distributed databases based on a client-server model where database nodes constitute name servers. Each domain has at least one authoritative DNS server that publishes information about that domain, including any name servers of sub-domains.

The top of the hierarchy is served by root name servers, which resolve Top Level Domain (TLD) names. Each domain/sub-domain under the TLD may be served by one or more authoritative name servers, which may be queried for information pertaining to their respective domains. When an authoritative name server is unable to respond to a request for information for a domain, the request may be propagated to name servers higher up in the DNS hierarchy.

The DNS architecture facilitates quick user-transparent updates to the DNS databases when there are changes associated with a domain name. Thus, for example, users may continue to use the domain names such as "cliqr.com" even when one or more underlying IP addresses associated with the domain ("cliqr.com") have changed.

FIG. 2 shows a flowchart for an exemplary method 200 for obtaining and deploying a certificate to support a secure communication protocol on one or more servers.

After starting in step 50, where initialization routines and housekeeping operations may be performed, in step 55, a counter "i" may be set to 1. Counter i may be used to maintain a count of the servers requesting certificates.

In step 60, a Certificate Signing Request (CSR) may be generated by server 12 using an application and/or API on the server 12 to obtain an X.509 certificate such as a SSL/TLS certificate. For example, the CSR may include the name of the entity (e.g. the organization) requesting the certificate, the domain name where the certificate will be installed, and various other information. The domain name, for example, may be the Fully Qualified Domain Name (FQDN), or the web address where the SSL/TLS Certificate will be used. Typically, SSL/TLS certificates include a Distinguished Name (DN) record. The DN record may further include the following fields: Country, State (or province), Locality (or city), Organization, Organizational Unit, and Common Name. The "Common Name" field refers to the domain name (e.g. "x.cliqr.com") of the server or VM associated with the certificate.

In step 70, a certificate may be obtained from a CA. For example, upon successful execution of the CSR, a private key and a CSR data file may be created. The private key and CSR data file may be sent to the CA, which may use the information to create an SSL/TLS certificate and a public key to match the private key without compromising the private key. Typically, a certificate is valid only for the associated FQDN. For example, a certificate associated with the FQDN "x.cliqr.com" may not be valid for "y.cliqr.com".

In step 80, the SSL/TLS certificate obtained in step 70 may be installed on Server i. If there are additional servers ("Y" in step 85), then, in step 90, the counter i is incremented by one and another iteration is begun at step 60. If there are no additional servers ("N" in step 85), the method terminates in step 90.

Referring to FIG. 1, in 2, Server 12 may respond to Connection/Identification Request 15 for example by sending a previously obtained SSL Certificate/Public Key 30 associated with server 12.

In 3, Application 10 may check the certificate root against a list of trusted CAs and verify that the certificate is unexpired and unrevoked. Further Application 10 may verify and that the common name associated with the certificate is valid for server 12. If Application 10 trusts the certificate, it may create, encrypt, and send back encrypted session key 35, which may be a symmetric key encrypted using the public key of server 12.

In 4, server 12 decrypts the encrypted symmetric session key 35 using its private key and sends back acknowledgement 40 encrypted with session key to start an encrypted session.

In 5, application 10 and server 12 may now communicate securely by encrypting exchanged data with the session key.

When the methods described above are used with cloud based applications and/or distributed applications where VMs may be brought up and/or torn down dynamically, no automatic user-transparent processes exist to dynamically obtain and/or associate certificates with newly spawned VMs so that secure communication may be facilitated with the newly spawned VMs. This is because a cloud-based application may spawn tens or hundreds of VMs when running. Further, one or more existing VMs may be torn down dynamically during runtime and the IP addresses associated with these VMs may be dynamically reallocated to other VMs. Therefore, traditional methods of obtaining and deploying certificates are either infeasible or cumbersome and may adversely affect application performance.

Therefore, some embodiments described herein facilitate agile secure communications for cloud based applications.

Figure 3A:
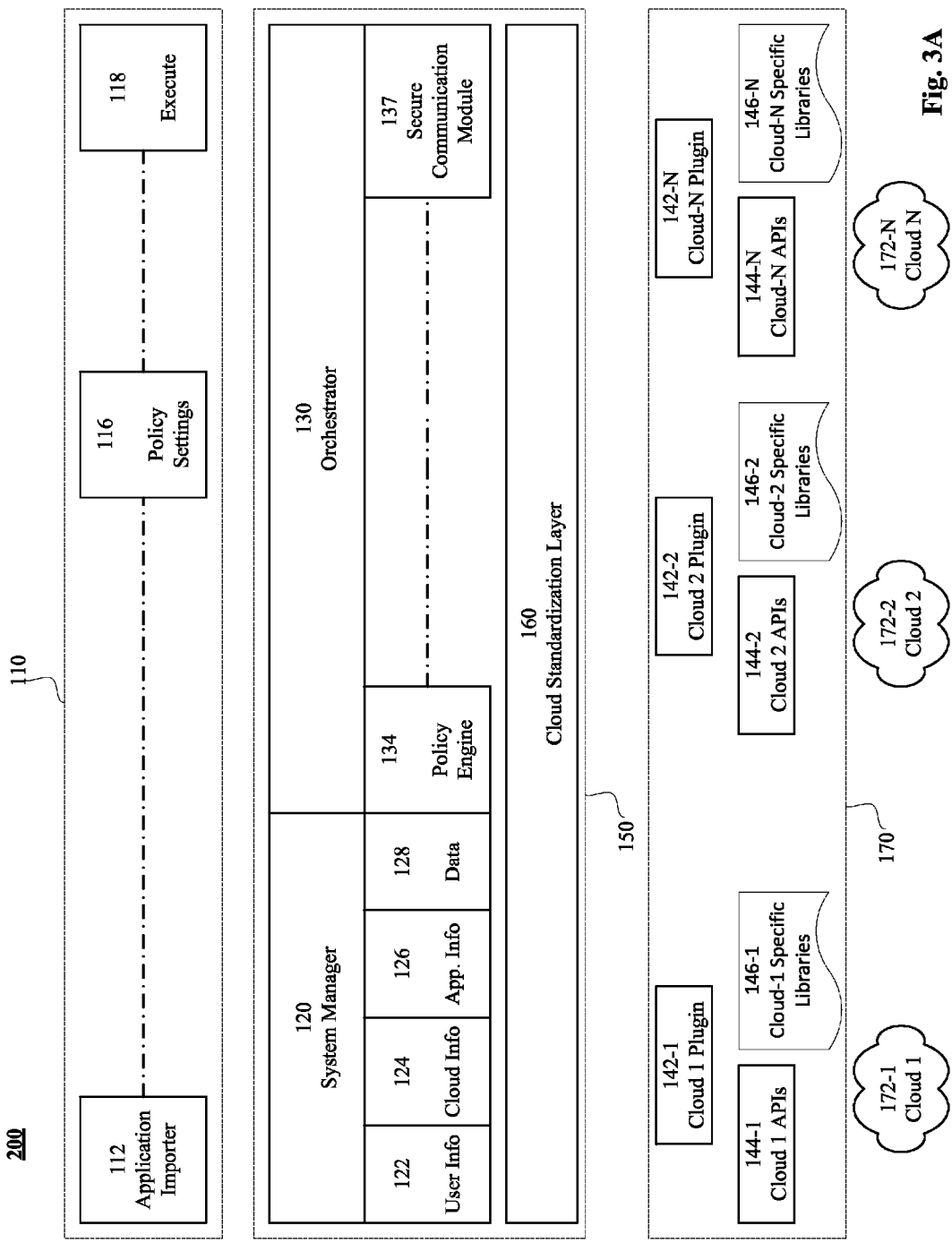
FIG. 3A shows an exemplary system for facilitating secure communications for cloud based applications in a manner consistent with disclosed embodiments.

FIG. 3A shows an exemplary system 200 for facilitating secure communications for cloud based applications in a manner consistent with disclosed embodiments. System 200 shown in FIG. 3A is used merely exemplary and is used to illustrate the operation of some disclosed embodiments. Techniques and embodiments disclosed may also be deployed and/or used in conjunction with various other cloud-based and/or distributed computing systems. As shown in FIG. 3A, architecture of system 200 can include exemplary User Interface Layer 110, Cloud Provisioning and Management Layer 150, and Cloud Application Deployment Layer 170.

Exemplary User Interface Layer 110 may facilitate user configuration of system 200 and may comprise Application Importer Module 112, Policy Setting Module 116, and Execute Module 118. For example, Application Importer Module 112 may be used to import an application profile, security certificates (e.g. an X.509 certificate) including https/SSL/TLS certificates and certificate expiry date information and other application specific information.

In some embodiments, the certificates associated with an application may be "wildcard certificates." Wildcard certificates are special certificates, which may allow web-hosts and enterprises to secure unlimited sub-domains of a domain name on a single certificate. For example, wildcard certificates may use Subject Alternative Names (SANs) to secure a domain and/or one or more of its first-level subdomains. For example, a wildcard certificate associated with "cliqr.com" may be used to facilitate secure communication with "x.cliqr.com", "y.cliqr.com" and/or "z.cliqr.com". Wildcard certificates may also simplify the certificate life-cycle management processes by removing the need to manage and track multiple individual certificates. In some embodiments, wildcard certificates associated with an application being imported may also be imported by Application Importer module 112. The term "wildcard certificate" is used to refer to the certificates because the first string in the Common Name associated with a wildcard certificate may be the wildcard character "*", which indicates that any DNS conforming string is acceptable in its place. For example, if the Common Name associated with a wildcard certificate is "*.cliqr.com", then the domains "x.cliqr.com", "y.cliqr.com" and "z.cliqr.com" may use the above wildcard certificate for secure communications.

Exemplary User Interface Layer 110 may also include various end-user modules that permit user customization and configuration of system 100. Exemplary Application Importer Module 112 may facilitate the importation of new applications into system 100. In some embodiments, imported applications may be displayed to users using a "desktop-style" view, where icons representing the various applications are shown to the user in a window or browser tab. In some embodiments, pre-published applications in a marketplace associated with system 200 (for example, applications in an application library or "app store" associated with or supported by system 200 may be imported by users directly onto their desktop view. In some embodiments, Application Importer Module 112 may allow users to license or buy one or more of pre-published applications.

In general, any software application may be imported using exemplary Application Importer Module 112 in User Interface Layer 110. For example, an organization may deploy a desktop application on a cloud to be shared by users (e.g. employees and/or customers). In some embodiments, the application and any associated security certificates (which may also be associated with the organization or entity) may be imported using Application Importer module 112.

In some embodiments, Policy Settings Module 116 may provide appropriate graphical user interfaces and other features to permit users to set, modify, and/or delete policies, which may be implemented using Policy Engine 134. For example, users may set policies that limit the clouds and/or configurations that specific user(s) and/or application(s) may use, limit the monetary budget available for an application run or a series of runs, etc.

In some embodiments, Execute Module 118 may provide user interfaces to permit users to select an application, a cloud 172 (from available clouds 172-1, 172-2 . . . 172-N), associate other user configurable settings with the application, and execute the application on the selected cloud 172.

In addition, as indicated by the dashed lines, User Interface Layer 110 may include several other modules (not shown) to allow users to specify system functionality related to reporting, auditing, billing, and permit viewing of application files and data on shared storage. For example, Reporting may provide analytical reports and runtime statistics over and/or other information. The reports may be diced and sliced based on user, application and/or other criteria. Auditing may use agent monitoring to track user actions and report them. Billing may track the price of each job for invoicing to the customer. Modules in User Interface Layer 110 may also allow users to set permissions and other attributes on application and storage files in order to facilitate sharing and collaboration with other users.

Exemplary Cloud Provisioning and Management Layer 150 may facilitate the management of cloud resources, prepare applications for deployment on one or more clouds, and may include Cloud Standardization Layer 160. Exemplary Cloud Provisioning and Management Layer 150 may also include exemplary Orchestrator module 130 and System Manager module 120.

In some embodiments, Cloud Standardization Layer 160 may include functionality to facilitate standardization of library constructs (such as shared storage, network, cluster, security, etc.) across a variety of cloud providers. Although cloud providers may have provider-specific Application Programming Interfaces (APIs) and other infrastructure differences, Cloud Standardization Layer 160 may provide applications a cloud agnostic or a cloud infrastructure-independent view of resources, including compute, storage and network resources. For example, Cloud Standardization Layer 160 can be a repository for various functional modules that permit applications to utilize various resources (including shared storage, server types, clusters and features such as queues, security, etc.) on each cloud in a cloud-agnostic manner.

In some embodiments, Cloud Standardization Layer 160 may maintain resource standardizations for various clouds, such as exemplary clouds 172-1, 172-2 . . . 172-N, as well as references to cloud-specific implementations of the standardizations for each cloud 172. In some embodiments, exemplary Cloud Standardization Layer 160 may also maintain service-level agreements (SLAs), capability information about each cloud resource, information pertaining to cloud availability, reliability, and security, and performance and pricing information. Information may be maintained by Cloud Standardization Layer 160 by using metadata XML files or databases, which, in some implementations, may be persistent. In some implementations, the capability information can be stored as {key, value} pairs in a database. Because individual clouds may have different capabilities for a standardized resource type, capability information may be indexed by cloud.

Exemplary Cloud Provisioning and Management Layer 150 may also include exemplary Orchestrator module 130 and System Manager module 120. In some embodiments, System Manager 120 may manage user information and coordinate various user tasks with Orchestrator 130. For example, System Manager 120 may receive, maintain, and update user information 122, cloud information 124, application related information 126 (e.g. application profile, security certificates such as X.509 certificates including https/SSL/TLS certificates, and certificate expiry date information) and other data 128 such as job history, housekeeping information etc. In some embodiments, System Manager 120 may provide information about the application being deployed. In some embodiments, System Manager 120 may also facilitate user views of application files and data on shared storage, may move the application files and data to cloud storage, and synchronize the application files and data between clouds.

In some embodiments, System Manager 120 may serve as a storehouse and manager of information pertaining to user activities. For example, System Manager 120 may act as a management layer to initiate and manage application deployment and monitoring activities. For example, System Manager may store, persist, and/or provide information imported by Application Importer Module 112 including security certificate information (e.g. X.509 certificate information) such as https/SSL/TLS certificate information and certificate expiry date information associated with an application/entity.

In one embodiment, System Manager 120 may interact with modules in User Interface Layer 110 in order to facilitate the performance of management tasks on applications that may have been initiated by the user through User Interface Layer 110. Management tasks facilitated by System Manager 120 may include, for example, initiating application deployment, facilitating secure communications, configuring user and cloud accounts, specifying policies for application runs, and specifying base metrics around desired application price and performance.

In addition System Manager 120 may also manage automated tasks, which, in some embodiments, may have been initiated by Orchestrator 130. System Manager 120 may also call or invoke functions implemented by Orchestrator 130 in order to perform various system related activities. For example, System Manager 120 may invoke Secure Communications Module 137 to facilitate secure communication with a new VM spawned by a cloud based application. In some embodiments, System Manager 120 may maintain a relational database or data repository with information pertaining to system users including user authentication and authorization information; a list of clouds (172-1, . . . 172-N) and available cloud configurations for each cloud 172-i; information pertaining to applications/entities such as X.509 certificate information, which may include https/SSL/TLS certificate information, certificate expiry date information; policies that a user may have specified, etc.

In some embodiments, Orchestrator 130 may use a common application representation to deploy and run a given application on any cloud, irrespective of implementation differences pertaining to the provisioning and utilization of application resources on the individual clouds, in part, by using functionality provided by Cloud Standardization Layer 160. In some embodiments, Orchestrator 130 may include a cloud coordinator or gateway.

In some embodiments, the common application representation may take the form of application descriptors (not shown), which may be input to Orchestrator 130. In some embodiments, a user may specify applications to import using Application Importer module 112 and application descriptors, which may include various primitives such as pattern and system primitives, may be used to describe applications to Cloud Standardization Layer 160.

The pattern and system primitives may describe the execution patterns as well as node, storage, communication and network characteristics pattern and system primitives. Exemplary application descriptors can include information such as: application software and hardware requirements, application profile (whether memory intensive, Input-Output intensive, CPU intensive, etc.), specification of a distributed computing paradigm, application steps (for workflow style applications). These primitives, Orchestrator 130, and cloud coordinator/gateway have also been described in greater detail in co-pending U.S. patent application Ser. No. 13/024,302 filed Feb. 9, 2011, entitled "Apparatus, Systems and Methods for Deployment and Management of Distributed Computing Systems and Applications," which has been incorporated by reference in its entirety into the present application.

In some embodiments, Orchestrator 130 may facilitate the deployment, running, and monitoring of applications on various clouds. For example, Orchestrator 130 may dynamically build clusters on a selected cloud 172 for application execution in response to an execute command entered by a user using an interface presented by Execute module 118. In some embodiments, Orchestrator module 130 may interact with Policy Engine 134, Secure Communication Module 137 and various other modules (not shown) depicted by the dashed line between the listed modules.

Orchestrator 130 may maintain routines and other program code that implement algorithms for deploying, optimizing, managing and monitoring application runs on clouds. In some embodiments, routines and other functions performed by Orchestrator 130 may be managed and initiated by the System Manager 120. Orchestrator 130 may also report back the status and results of the various orchestration activities to System Manager 120. In one embodiment, Orchestrator 130 may directly query System Manager for information such as application data, policies, and cloud information.

Policy Engine 134 may help enforce customer, user, and/or administrator policies. For example, Policy Engine 134 may enforce policies set by users through Policy Setting Module 116 that specify uptime criteria for clouds and/or applications that may be candidates for an application run, or the maximum budget per user over some period, or maximum application runtime on a cloud 172.

In some embodiments, Secure Communications module 137 may provide functionality to associate wildcard certificates with VMs spawned by an application. The wildcard certificates may be associated with an entity and a domain where an application may be run and/or deployed. In some embodiments, Secure Communications module 137 may be invoked and provide functionality to spawn VMs and associate appropriate SSL/TLS/https wildcard certificates with the VMs. In some embodiments, the SSL/TLS/https wildcard certificates may be obtained by querying System Manager 120 and/or from a cache and/or from one or more databases maintained by System Manager 120. In some embodiments, Secure Communications module 137 may register the VMs with a DNS server. For example, in one embodiment, functionality provided by Secure Communications module 137 may be used to obtain an IP address such as "X.Y.Z.W" associated with the VM, where $0 \le X, Y, Z, W \le 255$. In some embodiments, functionality provided by Secure Communications module 137 may be used to register a domain name associated with the VM. For example, for a VM with IP address "X.Y.Z.W" spawned in a domain "cliqr.com", the domain name registered with the DNS name server may take the form "X-Y-Z-W.cliqr.com." In some embodiments, the use of the IP address associated with a VM as part of its domain name may ensure that the domain name associated with each VM is unique. In general, a name based, at least in part, on the IP address associated with the VM may be used to register the VM with the DNS server. In some embodiments, various other techniques may be used to obtain the domain name for the VM. For example, a string based on a function of the IP address or generated using a pseudo-random process with the IP address as seed may be used. In some embodiments, the use of the IP addresses (appropriately modified to comply with domain naming schemes) may also facilitate easy identification of VMs for debugging, troubleshooting and other purposes.

In some embodiments, in part, by registering the VM with a DNS server and by associating wildcard certificates with a VM, Secure Communications module 137 may facilitate agile secure communications dynamically as new VMs are spawned by a distributed and/or cloud-based application. In some embodiments, Secure Communications module 137 may provide functionality to determine if one or more security certificates such as SSL/TLS/https certificates associated with an application have expired and/or are about to expire and may alert an entity associated with the TLS/SSL/https to renew and/or obtain a new certificate. For example, an application-related database maintained by System Manager 120 may be queried to determine expired certificates. In some embodiments, the validity period associated with a certificate may be stored as part of application related information by System Manager 120 at the time an application is imported by Application Importer module 112.

In some embodiments, Secure Communications module 137 may be implemented, in part, as a cloud agnostic service that associates wildcard certificates to VMs running in a cloud and/or registers the VM to be configured with a SSL/TLS/https certificate with a DNS server. In some embodiments, the cloud agnostic service may be invoked to spawn VMs that use secure communication, and/or when new VMs that use secure communication are spawned. For example, as discussed above, for a VM with IP address "X.Y.Z.W" spawned in a domain "cliqr.com", the domain name registered with the DNS name server may take the form "X-Y-Z-W.cliqr.com."

Further, in some embodiments, the cloud agnostic service associated with Secure Communications module 137 may provide functionality to determine if one or more SSL/TLS/https certificates associated with an application have expired and/or are about to expire and may alert an entity (e.g. the domain owner) associated with the TLS/SSL/https to renew and/or obtain a new certificate.

In some embodiments, Secure Communications module 137 and/or the cloud agnostic service associated with Secure Communications module 137 may reside on an SSL configured Virtual Appliance. In general, a software appliance is a software application, which may be combined with an operating system so that the software can be run easily on industry standard hardware or virtual machines. A virtual appliance may be created when the installation of a software appliance on a virtual machine is packaged. Thus, a virtual appliance refers to a virtual machine image that can run on a virtualization platform. A virtual machine image may take the form of a filesystem image and may include an operating system and the software required to deliver functionality or services. For example, Secure Communications module 137 and/or the cloud agnostic service associated with Secure Communications module 137 may form part of a virtual appliance, which, in some embodiments, may also include one or more other modules, software and/or services. In some embodiments, functionality provided by the virtual appliance may be used to register a VM with a DNS server and/or associate appropriate wildcard certificates with the VM, thereby facilitating agile secure communications dynamically as new VMs are spawned by a distributed and/or cloud-based application. For example, as discussed above, a name based, at least in part, on the IP address associated with the VM may be used to register the VM with the DNS server. In some embodiments, the virtual appliance may provide functionality to determine if one or more SSL/TLS/https certificates associated with an application have expired and/or are about to expire and may alert an entity associated with the TLS/SSL/https to renew and/or obtain a new certificate.

Tasks performed by Orchestrator 130 on Clouds 172 may be facilitated by Cloud Standardization Layer 160. For example, functionality provided by Cloud Standardization Layer 160 permits Orchestrator 130 to use infrastructure independent representations of application code to deploy applications. For example, the cloud agnostic service associated with Secure Communications module 137 may make use of functionality provided by Cloud Standardization Layer 160. In some embodiments, the infrastructure independent or cloud independent or cloud agnostic program code may be common across all clouds 172 because the Cloud Standardization Layer 160 uses cloud specific Plugins, APIs and Cloud Specific Libraries to perform tasks for Orchestrator 130 on any given cloud 172-n.

In some implementations, the deployment and running of applications and the dynamic management of clusters and other cloud resources may be facilitated by Cloud Application Deployment Layer 170. Cloud Application Deployment Layer 170 may include Cloud Plugins 142, Cloud APIs 144 and Cloud Specific Libraries 146.

In some embodiments, the dynamic management of clusters and other cloud resources may be facilitated by using a node management service running on a "cloud coordinator/gateway" or "gateway" (not shown) for a specific cloud 172. The gateway may also maintain Cloud APIs 144, such as Cloud-1 APIs 144-1, Cloud-2 APIs 144-2, etc., as well as Cloud specific Libraries 146, such as Cloud 1 Specific Libraries 146-1, Cloud 2 Specific Libraries 146-2, etc. The node management service may act as an intermediate layer between the cloud provider and the cloud orchestrator code and facilitate the addition or removal of nodes.

Cloud Specific Libraries 146 and Cloud APIs 144 may comprise a library of implementations for primitives and composite interfaces, respectively, for a specific cloud 172. In some embodiments, Cloud APIs 144 and Cloud Specific Libraries 146 may be invoked using Cloud Plugins 142. For example, Cloud Plugins 142 may be used to invoke appropriate Cloud APIs 144 and routines from Cloud Specific Libraries 146 that permit the deployment and running of applications on Clouds 172, where the applications may have been described using application descriptors and standardized primitives from Cloud Standardization Layer 160.

In some embodiments, when an application is to be deployed, a gateway may use Cloud APIs 144 and Cloud Specific Libraries 146 library to perform deployment and execution tasks for its cloud 172. For example, shared storage primitives on Cloud Standardization Layer 160 may lead to instantiation of a DFS shared storage implementation on an Amazon™ cloud, while instantiating the shared storage implementation on a Terremark™ cloud will set up NAS/SAN. In some embodiments, the gateway may also launch one or more agents, which can be deployed on nodes on Clouds 172, to monitor and report task status back to the gateway.

In some embodiments, functionality specified or configured by the user in User Interface Layer 110 may be implemented by one or more modules in the Cloud Provisioning and Management Layer 150 and/or Cloud Application Deployment Layer 170, which, in some implementations, may include software agents running on a server and/or on the various clouds. These software agents may monitor application runtime statistics, collect cloud related information such as but not limited to cloud load information, pricing information, security information etc., and/or collect information related to user actions.

In some embodiments, the software agents may run on each VM and may periodically check the validity of installed security certificates such as https/SSL/TLS certificates and may communicate with System Manager 120. In some embodiments, System Manager may trigger notifications to a cloud, domain and/or application administrator regarding renewal of the security certificates. In some embodiments, System Manager 120 may invoke an appropriate https/SS/TLS certificate vendor API to acquire new certificates and/or renew certificates and install the certificates on the VM. For example, new certificates may be obtained if a certificate has expired or if the expiration date of the current certificate falls within some threshold. The threshold may be some time period and may be specified relative to a point in time at which the certificate expiry date is determined. In some embodiments, the threshold may be set in an application/user profile and/or may be some predetermined time period.

As another example, the software agents may collect data for each application run, which may include but is not limited to: the time of the application run, cloud name where the application was run, cloud configuration for the application run, the pricing of that configuration, machine type, cluster size, storage size, memory size, network backbone type, storage implementation, data pertaining to success/failure/abnormal termination and cause, latency (length of an application run), throughput (number of transactions or requests), cost, etc.

For example, an agent on each node of a cluster may monitor application runs for individual applications. The data gathered and reported by the agent at a cluster node may be aggregated and used at the gateway level to monitor to track performance and costs across applications for a user and/or client. In some embodiments, System Manager 120 may aggregate data across users and/or applications by cloud and store the data in a form that may be used for analytics and recommendation purposes.

In some embodiments, cloud-specific implementation of the distributed computing application may be derived from the infrastructure independent representation and the cloud-specific implementation of the distributed computing application corresponding to the selected cloud-configuration may be run on the selected cloud-configuration. For example, an infrastructure independent representation of a distributed computing application may be deployed and run on various cloud configurations such as on one or more of Amazon EC2, Terremark vCloud, Rackspace Cloudserver, Microsoft Azure, Savvis, or private clusters.

Figure 3B:
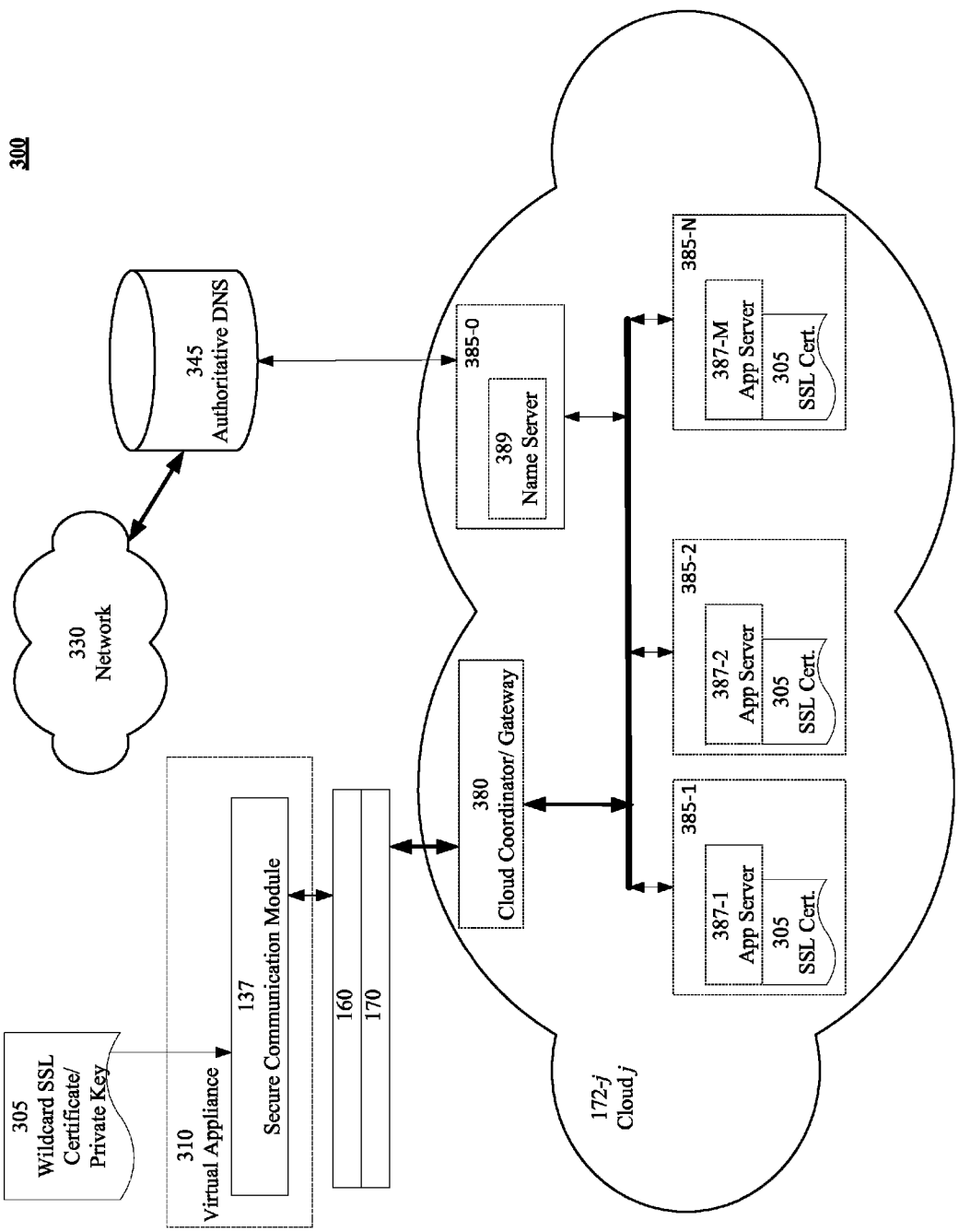
FIG. 3B shows an exemplary system to support agile secure communication for cloud based applications in a manner consistent with disclosed embodiments.

FIG. 3B shows a block diagram of an exemplary system 300 to support agile secure communication for cloud based applications in a manner consistent with disclosed embodiments. In some embodiments, system 300 may comprise Secure Communications Module 137, which may obtain Wildcard SSL certificate/private key 305. For example, Secure Communications Module 137 may obtain Wildcard SSL certificate/private key 305 from a trusted CA or another entity. In some embodiments, Secure Communications module 137 may reside on and/or form part of SSL configured Virtual Appliance 310 as indicated by the dashed box. In some embodiments, functionality associated with Secure Communications module 137 may be realized on Cloud 172-$j$, $1 \leq j \leq N$ using Cloud Standardization Layer 160, Application Deployment layer 170 and/or Cloud Coordinator/Gateway 380.

In some embodiments, functionality provided by Secure Communications Module 137 and/or Virtual Appliance 310 may be used to dynamically register one or more VMs 385-$k$, $1 \leq k \leq M$, with DNS Name server 389 and/or associate appropriate wildcard certificates 305 with VMs 385-$k$, thereby facilitating agile secure communications dynamically as new VMs 385-$k$ are spawned by a distributed and/or cloud-based application shown as App Servers 387-$k$, $1 \leq k \leq M$. For example, in one exemplary implementation for an entity CliQr, wildcard certificates may specify the Common Name as "*.cliqr.com" and each VM 385-$k$ may be named as "X-Y-Z-W.cliqr.com" where "X.Y.Z.W" is the IP address associated with VM 385-$k$. In the example above, functionality provided by Secure Communications Module 137 and/or Virtual Appliance 310 may then be used to dynamically register one or more VMs 385-$k$ using the name "X-Y-Z-W.cliqr.com" with the appropriate Name Server 389.

For example, an organization may share a desktop based application with users but may opt to deploy the application on a cloud, where it may be accessed securely by users, for example, through a browser using the "https" protocol. The term "desktop application" is used to collectively refer to typical applications that are typically run locally on a single computer such as exemplary local computer system 110, for example, by a user at a terminal coupled to the computing system.

For example, the desktop application may be hosted on one or more cloud nodes and accessed securely by users through a web browser. Cloud hosting of applications may offer several advantages including enhanced security, higher availability of the application, remote access, lower costs, etc. When "https" is used to secure communications with the cloud nodes, SSL/TLS/https certificates may be used. Accordingly, disclosed embodiments facilitate the dynamic association of the wildcard SSL/TLS/https certificate associated with the organization (and the domain name/application) to cloud nodes running the application. Because cloud nodes running the application belong to the organization, disclosed techniques facilitate dynamic association of the cloud nodes with a single security domain defined by the wildcard SSL/TLS/https certificate. Thus, new nodes may join and leave the security domain on the fly in a user-transparent manner without compromising security and/or impacting application deployment and/or performance. In some embodiments, App Servers 387-$k$, $1 \leq k \leq M$ may host the exemplary desktop application described above and/or one or more additional cloud based applications. Embodiments disclosed thus facilitate an "elastic" security domain, which may grow or shrink in accordance with the instantiating of new VMs and tearing down of existing VMs.

For example, as discussed above, a name based, at least in part, on the IP address associated with a VM 385-$k$ may be used to register the VM 385-$k$ with DNS Name Server 389. In some embodiments, DNS Name Server 389 may be implemented as VM 385-0. In some embodiments, virtual appliance 310 and/or Secure Communications module 137 and/or a cloud agnostic service associated with Secure Communications module 137 may keep track of application deployment on VMs 385-$k$ (e.g. by maintaining an application-VM mapping) and may update the wildcard SSL certificate on demand on one or more of the VMs 385-$k$. In another embodiment, SSL certificate/private key 305 may be pre-configured on a virtual appliance 310, and new VMs 387-$k$ may be spawned using virtual appliance 310.

In some embodiments, virtual appliance 310 and/or Secure Communications module 137 and/or a cloud agnostic service associated with Secure Communications module 137 may register a domain name which may be derived from the IP address associated with the VM 387-$k$. Thus, even if an IP address of some VM 387-$t$ is terminated during application execution and then gets reused during execution of the same application for a new VM 387-$n$, the IP address—domain name mappings will continue to hold and DNS name resolution will continue to work. In the example implementation describe above, if the domain name of a VM 387-$t$ with IP address "50.25.10.1" is "50-25-10-1.cliqr.com" and the VM 387-$t$ may uses a wildcard SSL certificate 305 associated with Common Name "*.cliqr.com", then, if VM 387-$t$ is torn down and a new VM 387-$n$ is spawned at a later point with the same IP address and with wildcard SSL certificate 305 with Common Name "*.cliqr.com", then, the DNS name "50-25-10-1.cliqr.com" will resolve correctly to new VM 387-$n$ thereby facilitating secure communication with new VM 387-$n$.

In some embodiments, virtual appliance 310 and/or Secure Communications module 137 and/or a cloud agnostic service associated with Secure Communications module 137 may: (i) obtain and/or be configured with wildcard SSL certificate and private key 305; (ii) launch name server 389, which may, in some instances, register with Authoritative DNS server 345 as a name server for the domain "cliqr.com"; (iii) instantiate VMs 385-$k$ in cloud 172-$j$ with wildcard certificate and private key 305; and (iv) dynamically register the IP addresses of VMs 385-$k$ with name server 389. In some embodiments, where a virtual appliance 310 is used, VMs 385-$k$ may be instances of virtual appliance 310. In some embodiments, name server 389 may, in turn, register with Authoritative DNS server 345, to permit, access to VMs 385-$k$ over network 330.

In some embodiments, as outlined earlier, Secure Communications Module 137 and/or virtual appliance 310 may also provide functionality to determine if one or more SSL/TLS/https certificates associated with an application have expired and/or are about to expire and may alert an entity associated with the TLS/SSL/https to renew and/or obtain a new certificate. For example, new certificates may be obtained if a certificate has expired or if the expiration date of the current certificate falls within some threshold time period. In some embodiments, the threshold may be set in an application/user/Secure Communications Module profile and/or may be some predetermined time period.

Figure 3C:
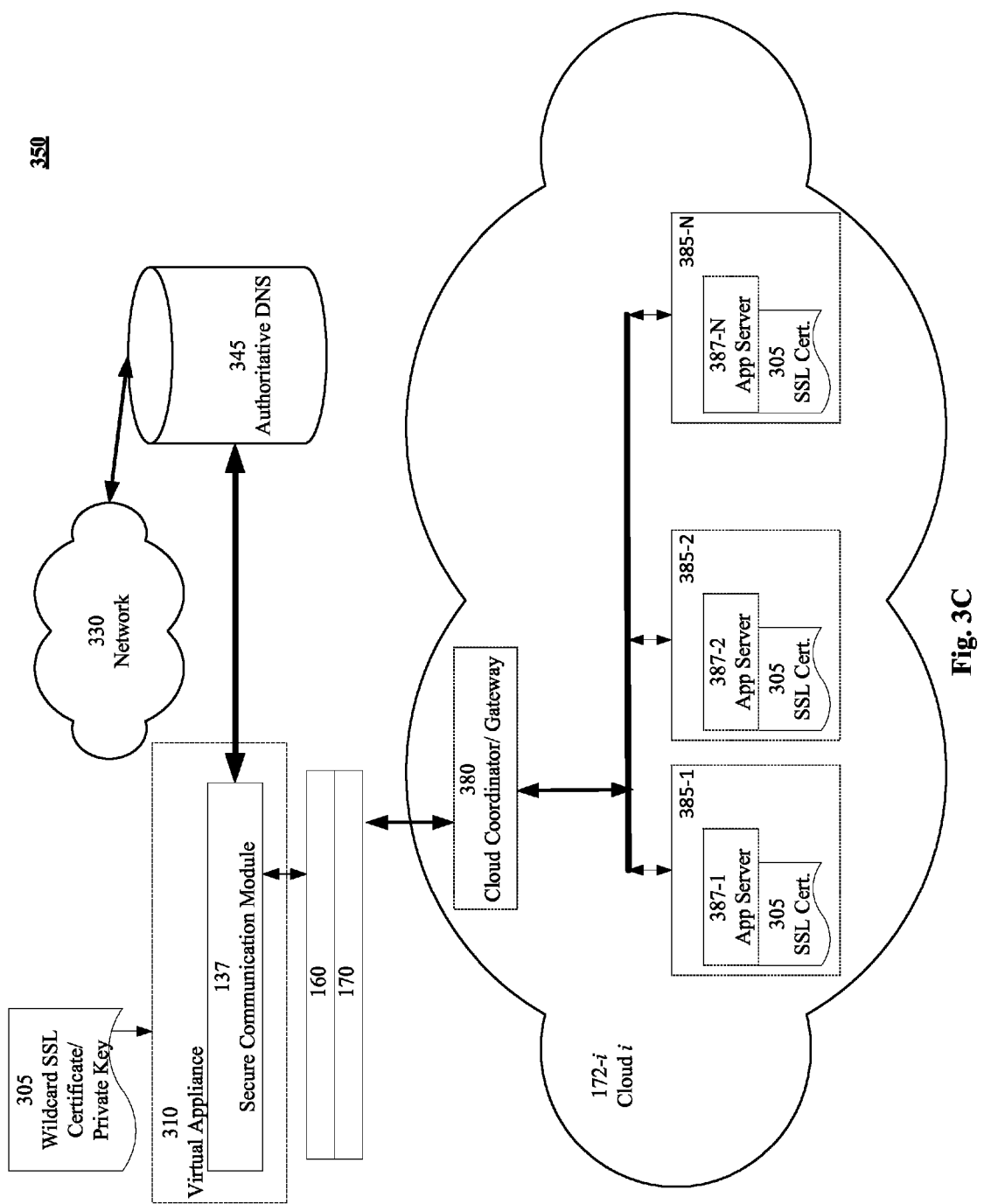
FIG. 3C shows an exemplary system to support agile secure communication for cloud based applications in a manner consistent with disclosed embodiments.

FIG. 3C shows a block diagram of an exemplary system 350 to support agile secure communication for cloud based applications in a manner consistent with disclosed embodiments. In FIG. 3C, except as outlined below, blocks with the same identifiers have functionality similar to the blocks described in FIG. 3B above. As shown in FIG. 3C, virtual appliance 310 and/or Secure Communications module 137 and/or a cloud agnostic service associated with Secure Communications module 137 may: (i) obtain and/or be configured with wildcard SSL certificate and private key 305; (ii) instantiate VMs 385-k in cloud 172-j with wildcard certificate and private key 305 and (iii) dynamically register the IP addresses of VMs 385-i with authoritative DNS name server 345. For example, an API of an external DNS service may be used to register the host name and IP address with authoritative DNS name server 345.

Figure 4:
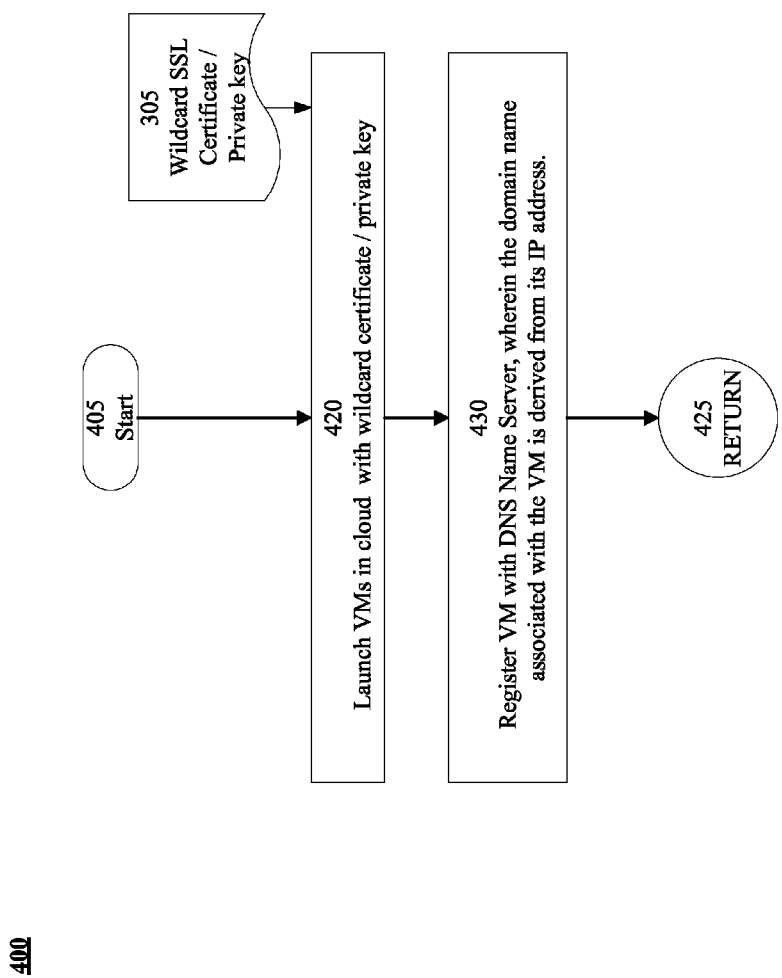
FIG. 4 shows and exemplary flowchart of a method for facilitating secure communications for cloud based applications in a manner consistent with disclosed embodiments.

FIG. 4 shows and exemplary flowchart of a method 400 for facilitating secure communications for cloud based applications in a manner consistent with disclosed embodiments. In some embodiments, portions of method 400 may be performed by virtual appliance 310 and/or Secure Communications module 137 and/or a cloud agnostic service associated with Secure Communications module 137.

In some embodiments, method 400 may be invoked in step 405. For example, in some embodiments, Secure Communication module 137 may be invoked by System Manager 120. Secure Communication module 137 may, in turn, invoke functionality provided by Cloud Standardization layer 160 and Application Deployment layer.

In step 420, VMs may be instantiated in a specific cloud along with wildcard certificate and private key 305 associated with an entity owning a domain used by the application. For example, one or more VMs 385-k may be instantiated with a wildcard SSL certificate and private key 305 associated with an entity owning a domain used by the application.

Next, in step 430, the VMs may be registered with a DNS Name Server, wherein the domain name associated with the VM may be derived from its IP address. For example, in one embodiment, the IP address associated with one or more VMs 385-k may be obtained, and a valid DNS name may be derived from the IP address. For example, for a VM with an IP address given by "50.25.10.1", a DNS name for the VM may be set to "50-25-10-1.cliqr.com", where "cliqr.com" is the higher level domain name. Control may then be returned to the invoking routine in step 425.

Upon successful registration of the VMs with the DNS server, secure communication with the VMs may commence using the SSL certificate, and public and private keys. In some embodiments, wildcard SSL certificate and private key 410 may be configured as part of a virtual appliance such as virtual appliance 310.

Note that method 400 is exemplary and for descriptive purposes only and functionality disclosed in one or more steps may be disclosed may be rearranged (re-ordered, combined and/or deleted) in a manner consistent with disclosed embodiments, as would be apparent to one of ordinary skill in the art.

Note that although the description above uses exemplary cloud infrastructures to describe possible implementations, alternate implementations are envisaged and the methods described could be extended to other cloud infrastructures as would be apparent to one of ordinary skill in the art. Further, although primitives, composite interfaces, and templates have been described as exemplary intermediate infrastructure independent representations, other infrastructure independent intermediate representational schemes may also be used. In some embodiments, software to facilitate conducting the processes described above can be recorded on computer-readable media or computer-readable memory. These include, but are not limited to, hard drives, solid state drives, optical media, non-volatile storage of various kinds, removable media, and the like.

In some embodiments, the methods and modules described herein may be implemented using a variety of wired and/or wirelessly networked processors, various computers, and computing devices, including mobile devices such as smartphones, notebooks, and handheld computers, and various distributed computing systems.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor-implemented method comprising:
    instantiating a first Virtual Machine (VM) associated with a cloud-based application on a cloud infrastructure, wherein the first VM is dynamically configured with a private key associated with the first VM and a first wildcard security certificate associated with the first VM, the first wildcard security certificate comprising:
        a public key corresponding to the private key, and
        a Common Name, the Common Name including a wildcard character as a first substring; and
    registering, with a domain name server, a domain name associated with the first VM, wherein the domain name is derived from an Internet Protocol (IP) address associated with the first VM and the Common Name associated with the first wildcard security certificate.

2. The method of claim 1, wherein the domain name server is a DNS authoritative name server for a domain corresponding to the Common Name.

3. The method of claim 1, wherein the domain name server is a second VM running on the cloud infrastructure.

4. The method of claim 1, wherein the first wildcard security certificate is a X.509 based certificate.

5. The method of claim 4, wherein the first wildcard security certificate is one of a wildcard Secure Sockets Layer (SSL) or a wildcard Transport Layer Security (TLS) certificate.

6. The method of claim 1, further comprising:
    determining an expiry date associated with the first wildcard security certificate.

7. The method of claim 6, further comprising:
    dynamically obtaining a second wildcard security certificate specifying the Common Name upon detecting that:
        the first wildcard security certificate has expired; or
        a period for expiry of the first wildcard security certificate is within a threshold of a current time.

8. The method of claim 7, further comprising dynamically installing the second wildcard security certificate on the first VM.

9. The method of claim 1, wherein the method is implemented using a virtual appliance configured with the first wildcard security certificate and wherein the virtual appliance instantiates the first VM.

10. The method of claim 1, wherein the method is implemented using a cloud agnostic service.

11. The method of claim 10, wherein the cloud agnostic service is an infrastructure independent representation that is implemented by utilizing at least one cloud-specific implementation of the infrastructure independent representation of the cloud agnostic service, and wherein the at least one cloud-specific implementation of the cloud agnostic service corresponds to the cloud infrastructure.

12. An apparatus comprising:
at least one processing system comprising a memory, the at least one processing system coupled to a cloud-based infrastructure, the at least one processing system being configured to:
  dynamically configure a first Virtual Machine (VM) with a private key associated with the first VM and a first wildcard security certificate associated with the first VM, the first wildcard security certificate comprising:
    a public key corresponding to the private key, and
    a Common Name, the Common Name including a wildcard character as a first substring; and
  register, with a domain name server, a domain name associated with the first VM, wherein the domain name is derived from an Internet Protocol (IP) address associated with the first VM and the Common Name associated with the first wildcard security certificate.

13. The apparatus of claim 12, wherein the domain name server is a DNS authoritative name server for a domain corresponding to the Common Name.

14. The apparatus of claim 12, wherein the domain name server is a second VM running on the cloud-based infrastructure.

15. The apparatus of claim 12, wherein the processing system is further configured to:
  dynamically determine an expiry date associated with the first wildcard security certificate.

16. The apparatus of claim 15, wherein the processing system is further configured to:
  dynamically obtain a second wildcard security certificate specifying the Common Name upon detecting that:
    the first wildcard security certificate has expired; or
    a period for expiry of the first wildcard security certificate is within a threshold of a current time.

17. The apparatus of claim 12, wherein the processing system forms part of a virtual appliance configured with the first wildcard security certificate and wherein the virtual appliance instantiates the first VM.

18. A non-transitory computer-readable medium comprising instructions, which when executed by a processor, perform steps
in a method comprising:
instantiating a first Virtual Machine (VM) associated with a cloud-based application on a cloud infrastructure, wherein the first VM is dynamically configured with a private key associated with the first VM and a first wildcard security certificate associated with the first VM, the first wildcard security certificate comprising:
  a public key corresponding to the private key, and
  a Common Name, the Common Name including a wildcard character as a first substring; and
registering, with a domain name server, a domain name associated with the first VM, wherein the domain name is derived from an Internet Protocol (IP) address associated with the first VM and the Common Name associated with the first wildcard security certificate.

19. The computer-readable medium of claim 18, wherein the domain name server is a DNS authoritative name server for a domain corresponding to the Common Name.

20. The computer-readable medium of claim 18, wherein the domain name server is a second VM running on the cloud infrastructure.

21. The computer-readable medium of claim 18, further comprising:
  determining an expiry date associated with the first wildcard security certificate.

22. The computer-readable medium of claim 21, further comprising:
  dynamically obtaining a second wildcard security certificate specifying the Common Name upon detecting that:
    the first wildcard security certificate has expired; or
    a period for expiry of the first wildcard security certificate is within a threshold of a current time.

23. The computer-readable medium of claim 19, wherein the steps are implemented using a virtual appliance configured with the first wildcard security certificate and wherein the virtual appliance instantiates the first VM.

* * * * *